United States Patent [19]

Schulte

[11] Patent Number: 4,492,555
[45] Date of Patent: Jan. 8, 1985

[54] MULTIPLE HOT RUNNER INJECTION BUSH

[75] Inventor: Wolfgang Schulte, Schalksmühle-Heedfeld, Fed. Rep. of Germany

[73] Assignee: Firma Jetform Heisskanalnormalien und Zubehor GmbH, Fed. Rep. of Germany

[21] Appl. No.: 519,996

[22] Filed: Aug. 3, 1983

[30] Foreign Application Priority Data

Aug. 7, 1982 [DE] Fed. Rep. of Germany ... 8222390[U]

[51] Int. Cl.³ .............................................. B29F 1/08
[52] U.S. Cl. ................................. 425/548; 264/328.8; 264/328.9; 264/328.15; 425/549; 425/568; 425/588
[58] Field of Search ............... 425/547, 548, 549, 568, 425/572, 588; 264/328.8, 328.9, 328.14, 328.15

[56] References Cited

U.S. PATENT DOCUMENTS

| | | | |
|---|---|---|---|
| 4,094,447 | 6/1978 | Gellert | 425/568 |
| 4,184,836 | 1/1980 | Rees | 425/588 |
| 4,212,624 | 7/1980 | Ando et al. | 425/548 |
| 4,268,241 | 5/1981 | Rees et al. | 425/548 |
| 4,345,892 | 8/1982 | Schulte et al. | 425/548 |

FOREIGN PATENT DOCUMENTS

| | | |
|---|---|---|
| 13118 | 12/1979 | European Pat. Off. . |
| 2356764 | 5/1974 | Fed. Rep. of Germany . |
| 2852458 | 12/1978 | Fed. Rep. of Germany . |
| 622985 | 9/1977 | Switzerland ......... 425/549 |

Primary Examiner—Jay H. Woo
Assistant Examiner—Mike McGurk
Attorney, Agent, or Firm—Bacon & Thomas

[57] ABSTRACT

A multiple hot runner injection bush for lateral tunnel gating, with a foot and a shaft heated by a heating element and a central hot sprue arranged therein, furthermore, with a heated nozzle head which contains radially extending injection channels. The technical problem of the invention is seen in the exact heat control and adjustment of the nozzle head if a plurality of mould nests is gated. The nozzle head is provided as a plate-like head and projects beyond the diameter of the shaft by a multiple distance of the diameter of the shaft (two times through five times). The nozzle head incorporates, at least, four radially extending injection channels. The nozzle head comprises a plane ring face, adjacent to the shaft, and an outer covering apron. A copper ring is attached on the ring face. The copper ring carries a spirally arranged high capacity coil heater.

9 Claims, 4 Drawing Figures

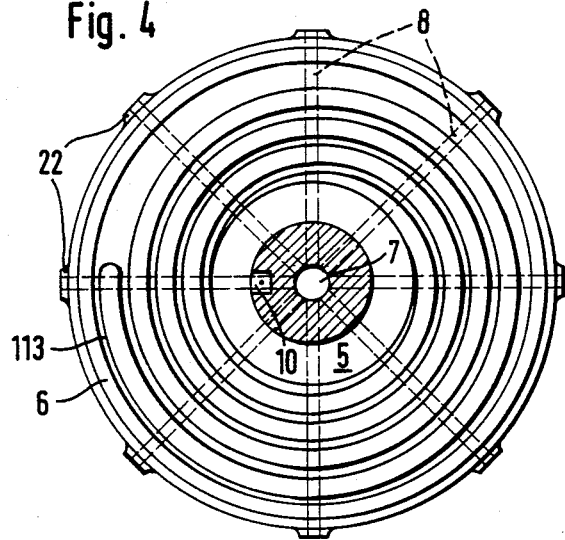
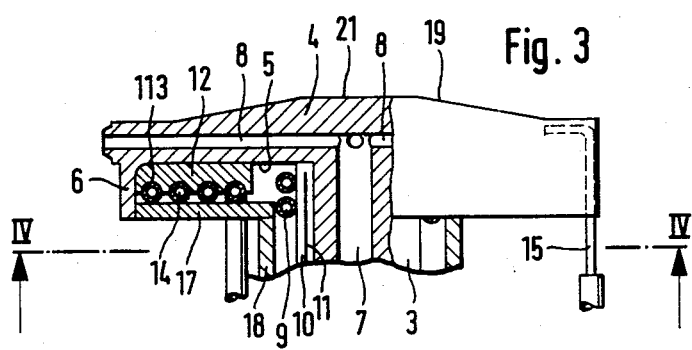

MULTIPLE HOT RUNNER INJECTION BUSH

BACKGROUND OF THE INVENTION

1. Field of the Invention

The invention relates to a multiple hot runner injection bush for lateral tunnel gating, with a foot and a shaft heated by a heating element and a central hot sprue arranged therein, furthermore, with a heated distributor head which contains radially extending injection channels.

2. Description of the Prior Art

A multiple hot runner injection bush of this type is described in the U.S. Pat. No. 4,345,892. The coil heater cartridge of the shaft is extended into the nozzle head so that also the nozzle head itself is heated. Due to the fact that the multiple hot runner injection bush is situated in a chamber of the nozzle-sided cooled mould, the nozzle head is exposed to completely different cooling conditions than the shaft. Particularly if the nozzle head is designed as a large area and comprises a plurality of injection channels, then a common heat control of shaft and head is not possible. Then it is possible that an overheating of the material within the shaft or an undercooling in the nozzle head may occur. Both will lead to the formation of flow structures in the injection moulded products and are of disadvantage for the sequence of operations within the injection moulding machine.

SUMMARY OF THE INVENTION

An object of the invention is such a configuration of the nozzle head that in case of the gating of a plurality of mould nests an exact heat control and/or heat adjustment is possible. Also a wide extensive nozzle head with a plurality of injection channels shall be heated in such a manner that the material is always kept in the plastic condition and an undercooling does not take place.

According to the invention this object is solved by the following features:
(a) the nozzle head is provided as a plate-like head and projects beyond the diameter of the shaft by a multiple distance of the diameter of the shaft (two times through five times);
(b) the nozzle head incorporates, at least, four radially extending injection channels;
(c) the nozzle head comprises a plane ring face, adjacent to the shaft, and an outer covering apron;
(d) a copper ring is attached on the ring face;
(e) the copper ring bears a spirally arranged high capacity coil heater.

The invention differs from the prior art in a nonobvious manner in that the large-area nozzle head is heated by a heated copper ring. Thus, constant heating of the head is possible, independent of the shaft. Thereby the material within the nozzle head can be kept in a plastic condition so that cooling structures or flow structures can be avoided. Consequently, the multiple hot runner injection bush is suitable for the injection of a plurality of mould nests, e.g. 6, 8, or up to 16 mould nests. The thermal loss of the large-area nozzle head can be compensated easily by the head heating, without occurrence of superheating in the central hot sprue.

As a further development of the invention it is provided that the nozzle head contains a thermoelement. This thermoelement allows a particular temperature control and/or temperature adjustment of the nozzle head in order to exclude an excessive cooling of the nozzle head. In order to keep the material on an optimum temperature, a large quantity of heat can be delivered into the large-area nozzle head which extends far into the die-platens and, thus, is exposed to an intense cooling. In spite of this high heat input in the head region, the addition of heat in the region of the shaft can be kept low so that in the region of the shaft the risk of an overheating of the material is excluded.

Furthermore, the invention provides that the copper ring comprises a spiral groove for the reception of a high capacity coil heater. By this configuration a particularly complete heat transfer from the high capacity coil heater to the copper ring is guaranteed due to the fact that the high capacity coil heater is enclosed by the walls of the sprial groove to a large extent.

In order to concentrate the heat to the nozzle head, the invention provides that the copper ring with the high capacity coil heater is closed by a cover ring.

As a further development of the invention it is provided that a high capacity coil heater is wound helically on the shaft, and that a thermoelement is arranged in an axial slot. The high capacity coil heater for the heating of the shaft is wound in the form of a helical line with a variable pitch so that the heating of the central hot sprue is possible in an optimal manner and is constant over the whole length. This central hot sprue is adjusted by the aid of said thermoelement separately so that the material within the hot sprue is protected against superheating.

Moreover, the invention provides that the foot comprises a separate heater. Thereby a further improvement of the heat control within the multiple hot runner injection bush is guaranteed.

Finally, the invention provides that the front face of the head comprises a galvanic heat insulating layer. This is effective on the principle of the black reflection. That is particularly important, if the multiple hot runner injection bush projects beyond the parting plane of the die and is exposed to extreme cooling during the opening phase of the die.

BRIEF DESCRIPTION OF THE DRAWINGS

Examples of the invention will be described in the following with reference to the attached drawings, wherein FIG. 3 is a partial section through the head of a modified embodiment of a multiple hot runner injection bush, whilst FIG. 4 is a section along line IV—IV in FIG. 3 with shaft tube and cover ring taken away.

DESCRIPTION OF THE PREFERRED EMBODIMENT

Figure 1:
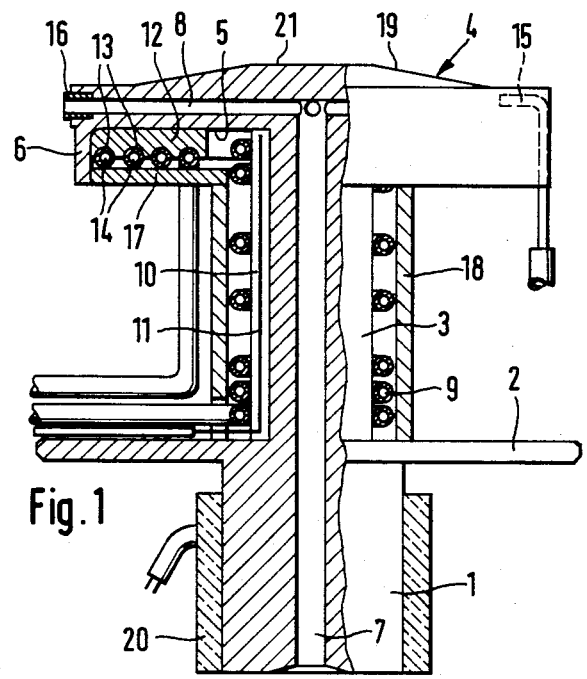
FIG. 1 is a view of the multiple hot runner injection bush, half of it as a sectional view.
Figure 2:
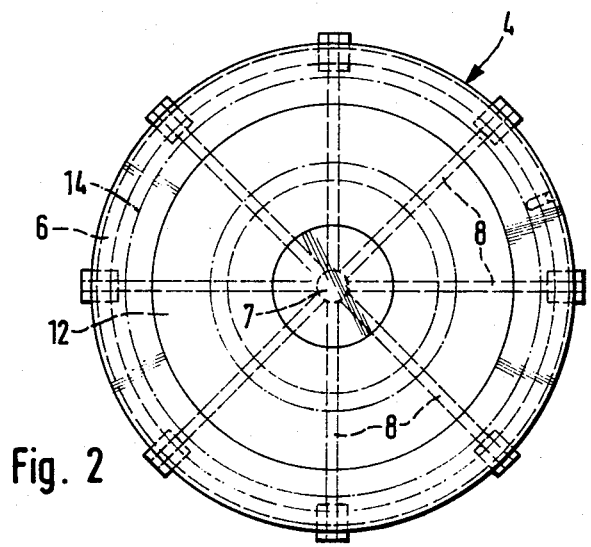
FIG. 2 is a top view of FIG. 1.

A multiple hot runner injection bush in the usual manner consists of an appropriate steel. A centering plate 2 is added to a foot 1. Then a shaft 3 follows which carries a plate-like nozzle head 4. This plate-like nozzle head 4 is outstretching and projects beyond the diameter of the shaft 3 by a multiple distance of the shaft diameter (two times up to five times). The head 4 comprises, on the side as directed to the shaft 3, a plane ring face 5, to which on the outer edge a covering apron 6 follows. The foot 1, the centering plate 2, and the shaft 3 normally are separate parts, which are kept together by centering connections and screw connections. The representation of FIG. 1 is understood schematically in that regard and shows just the outer shape of foot 1, centering plate 2, and shaft 3.

Within the foot 1 and the shaft 3 a central hot sprue 7 extends, to which a plurality of radially extending injection channels 8 are added within the nozzle head 4. At least, four injection channels 8 are provided. Up to 16 injection channels may be provided. Into the front end of each injection channel 8 an orifice piece 16 may be inserted, which is exactly oriented to the appertaining sprue opening of the molding chamber wall and the orifice face of which is ground. Just these orifice pieces 16 abut the specific sprue opening in a sealing manner and possess an immediate heat contact with the moulding chamber wall only.

Foot 1 is heated by a ring heating body 20. Shaft 3 is heated by a high capacity coil heater 9. The high capacity coil heater 9 is wound with variable ascending pitch, in order to adapt the heating capacity delivered to the specific heat consumption. A thermoelement 11 is arranged within a longitudinal slot 10 of the shaft 3.

The nozzle head 4 carries, on the ring face 5, a copper ring 12, which carries in grooves 13, a spiral wound high capacity coil heater 14. The high capacity coil heater 14 directly heats the copper ring 12, from which the heat is transferred to the nozzle head 4. Thereby a constant heating of the nozzle head 4 is guaranteed. The copper ring takes up the heat well and distributes the heat uniformly to the nozzle head 4. In addition, a thermoelement 15 is installed in the nozzle head 4. The copper ring 12 and the high capacity coil heater 14 are covered by a cover ring 17, which is added to the covering apron 6 and is welded thereto. This cover ring 17 prevents undesired head radiation of the high capacity coil heater 14 and concentrates the thermal power to the head 4. A shaft tube 18 which surrounds the shaft 3 and the high capacity coil heater 9 adjoins the cover ring 17.

The front face 19 of the nozzle head 4 comprises a galvanic heat insulating layer. The same prevents, according to the principle of the black reflection, an undesired heat radiation of the nozzle head 4 in the open condition of the die.

The high capacity coil heaters 9 and 14 and the thermoelements 11 and 15 are shown on the drawing. The connections themselves are not shown. The connection lines extend in the usual manner in channels of the die platens also not shown.

The centering plate 2 is located in a reception of a clamping plate or die platen so that thereby the multiple hot runner injection bush is centered. The nozzle head 4 projects into a chamber of the orifice-sided die-half. The center 21 of the head is supported on a cross arm, of a die platen, not shown, in order to cushion the injection pressure thereby. The shaft 3 is separated from the chamber wall by a large interspace. The nozzle head 4 is also separated on all sides by an interspace from the wall of the die. Just the orifice pieces 16 abut the orifice faces of the sprue runners and possess an immediate heat contact with the moulding chamber wall. In other respects on all sides a distance is between the multiple hot runner injection bush and the moulding chamber wall. Thereby an extensive heat insulation in regard to the cooled die platens is given. The shaft 3 as well as the nozzle head 4 may be adjusted separately by means of the thermoelements 11 and 15, respectively, so that an adaptation of the heat delivery to the specific heat requirement is possible by the specific high capacity coil heaters. By this, within the hot sprue 7 as well as within the injection channels 8, the material can be kept on a temperature, which guarantees a plastic condition. An overheating of the material on the one hand or an undercooling of the material on the other hand is excluded. Consequently, optimum working conditions are guaranteed. Decompositions of the material or undercooling and in connection therewith, flow structures within the products do not occur.

FIG. 3 shows a modified embodiment of the nozzle head 4. The heating of the nozzle head 4 is carried out in the same manner as described above by means of a copper ring 12, the spiral groove 113 of which carries the high capacity coil heater 14. The injection channels 8 terminate in orifice projections 22. These orifice projections 22 are provided uniformly with the nozzle head 4 as concerns the material. The front faces of the orifice projections 22 are ground and are designed for the abutment on the orifice faces of the sprue openings of the die. Only these orifice projections 22 contact the sprue openings of the die, whilst otherwise a gap remains free over the periphery of the nozzle head 4. That is of high advantage for the thermal economy, as also outlined above. In this case any separated orifice pieces are not necessary.

Within the scope of the invention the high capacity coil heaters 9 and 14 may also be provided as a uniform or integrated high capacity coil heater which is coiled in one piece and performs the heating of the nozzle head 4 as well as of the shaft 3. In this case, of course, just one thermoelement is necessary. Such a configuration is possible, if a temperature control of the multiple hot runner injection bush in a simplified form with one control position is possible.

The multiple hot runner injection bush guarantees in regard to the thermal economy a nearly complete separation against the chamber walls of the die, and, in addition renders possible an independent regulation of the nozzle head and of the shaft. Thereby an optimum adjustment in regard to the properties of the material and of the parameters and conditions of the specific injection moulding die is secured.

We claim the following:
1. A multiple hot runner injection bush for lateral tunnel gating, with a foot and a shaft heated by a heating element and a central hot sprue arranged therein, furthermore, with a nozzle head heated by a heating element wherein the nozzle head contains radially extending injection channels, characterized by the following features:
    (a) the nozzle head is provided as a plate-like head and projects beyond the diameter of the shaft by a multiple distance of the shaft diameter;
    (b) the nozzle head incorporates, at least, four radially extending injection channels;
    (c) the nozzle head comprises a plane ring face adjacent to the shaft, and an outer covering apron;
    (d) a copper ring is attached on the ring face;
    (e) the copper ring carries a spirally arranged high capacity coil heater;
    (f) the heating element for the nozzle head and the heating element for the shaft are independently controllable.
2. Multiple hot runner injection bush according to claim 1, characterized in that the nozzle head contains a thermoelement.

3. Multiple hot runner injection bush according to claim 1, characterized in that the copper ring comprises a spiral groove for the reception of the high capacity coil heater.

4. Multiple hot runner injection bush according to claim 3, characterized in that the copper ring with the high capacity coil heater is closed by a cover ring.

5. Multiple hot runner injection bush according to claim 4, characterized in that a high capacity coil heater is wound helically on the shaft.

6. Multiple hot runner injection bush according to claim 5, characterized in that a shaft tube encloses the high capacity coil heater on the shaft.

7. Multiple hot runner injection bush according to claim 6, characterized in that a thermoelement is arranged in an axial slot of the shaft.

8. Multiple hot runner injection bush according to claim 1, characterized in that the foot comprises a separate heater.

9. Multiple hot runner injection bush according to claim 1, characterized in that the front face of the head comprises a galvanic heat insulating layer.

* * * * *